MAGNETIC MEMORY FEATURING THIN FILM COINCIDENT CURRENT ELEMENT

Filed March 3, 1967 3 Sheets-Sheet 1

Michael May,
William W. Powell,
INVENTORS.
BY.
Robert Thompson
ATTORNEY.

MAGNETIC MEMORY FEATURING THIN FILM COINCIDENT CURRENT ELEMENT 3,493,941
Patented Feb. 3, 1970

1

3,493,941

MAGNETIC MEMORY FEATURING THIN FILM COINCIDENT CURRENT ELEMENT

William W. Powell, Manhattan Beach, and Michael May, Los Angeles, Calif., assignor to Hughes Aircraft Company, Culver City, Calif., a corporation of Delaware Filed Mar. 3, 1967, Ser. No. 620,303
Int. Cl. G011c *11/14*
U.S. Cl. 340—174 5 Claims

ABSTRACT OF THE DISCLOSURE

This invention relates generally to thin film devices and more particularly to thin film magnetic devices of the type that can be used as transformers, inductors, and the like.

In the electronic technology, much emphasis and development has gone into making thin film electronic circuitry. Consequently, certain electrical components such as thin film magnetic memories can be readily fabricated by thin film techniques. However, other electrical components, such as transformers, have not readily lent themselves to batch fabrication with other thin film components.

Accordingly, it is an object of this invention to provide an improved inductive device that can be fabricated in conjunction with other thin film circuitry.

Another object is to provide an improved thin film transformer.

Still another object is to provide a thin film magnetic circuit which is capable of operating as a transformer.

Yet another object is to provide a thin film magnetic device that is capable of operating as a coincident current transformer of the type that can be used as a word select driver.

A further object is to provide improvements in methods for making magnetic devices of the above type.

Other objectives may be attained by providing an inductive device arranged in a plurality of layers on a substrate. The plurality of the layers includes thin film electrical conductors which are sandwiched between a pair of magnetic thin film elements such as permalloy. The conductors and the magnetic elements are generally insulated from and magnetically coupled with one another. In operation, when electrical currents flow in certain ones of the plurality of the conductors, a magnetic field causes reversal of the magnetic state of the thin film elements through domain wall motion through the thickness of the film. However, the device could switch by synchronous coupled rotation of all the electron spin produced magnetic moments which enhance the magnetic fields in ferro-magnetic material. The change in the magnetization of the magnetic elements induces an electrical signal in another one of the conductors, thereby producing an output signal.

Other objects, features, and advantages of this invention will become apparent upon reading the detailed description and referring to the accompanying drawings, in which.

2

Figure 3:
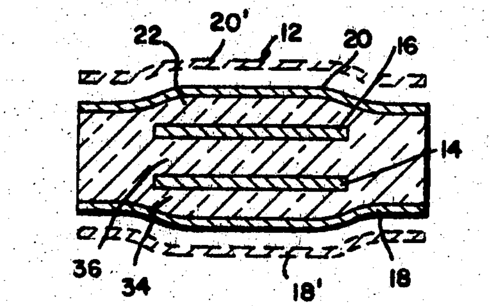
FIG. 3 is a schematic diagram showing the relationship of the conductors to the overlap of the thin film magnetic elements.
Figure 8:
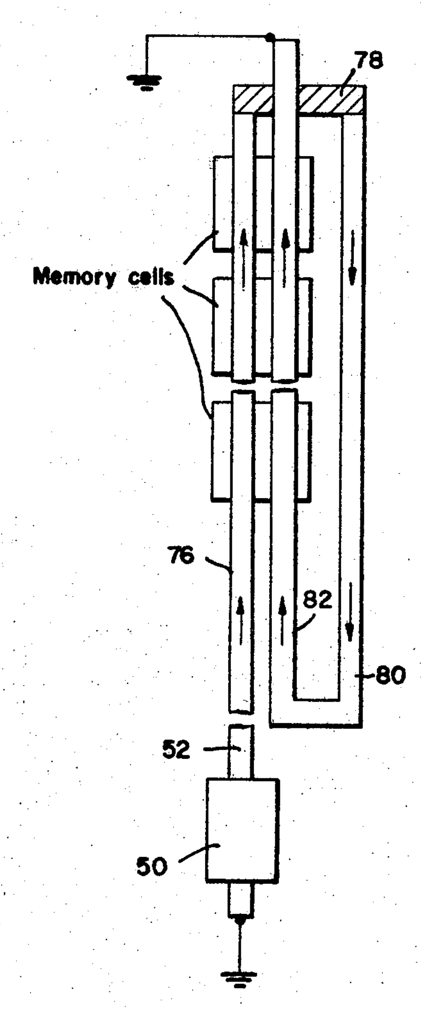
Figure 5:
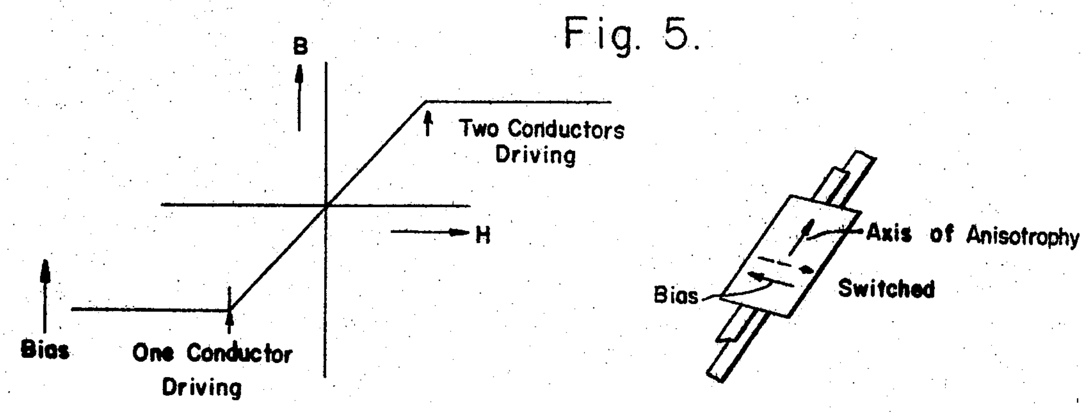
Figure 6:
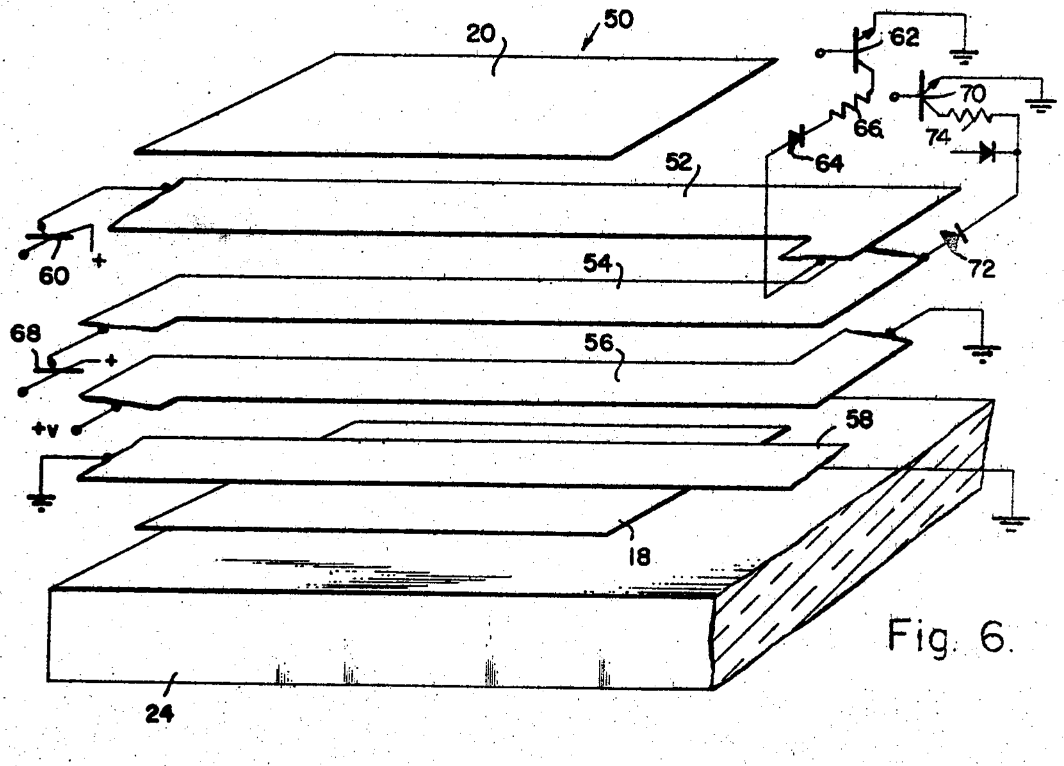
Figure 7:
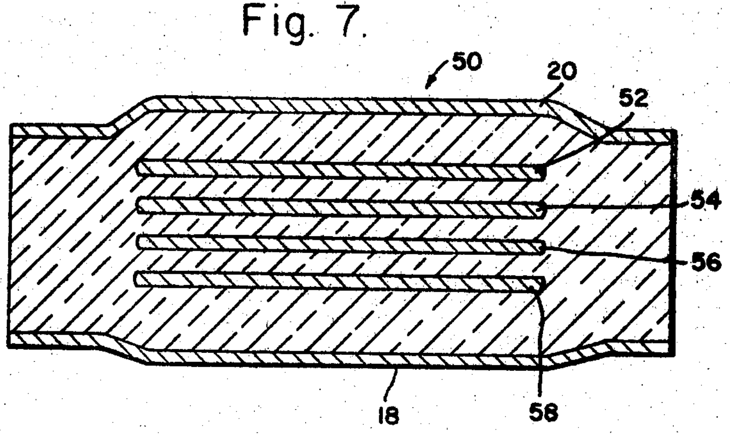

FIG. 5 is a near zero loss hysteresis curve of the thin film magnetic material in the hard direction transverse to the axis of anisotropy;

FIG. 6 is an exploded perspective view of a coincident current word drive transformer;

FIG. 7 is a cross-sectional side view of the transformer of FIG. 3 when assembled; and FIG. 8 is a plan view showing the relationship of the transformer to a multiple turn word drive line and a thin film memory.

Figure 1:
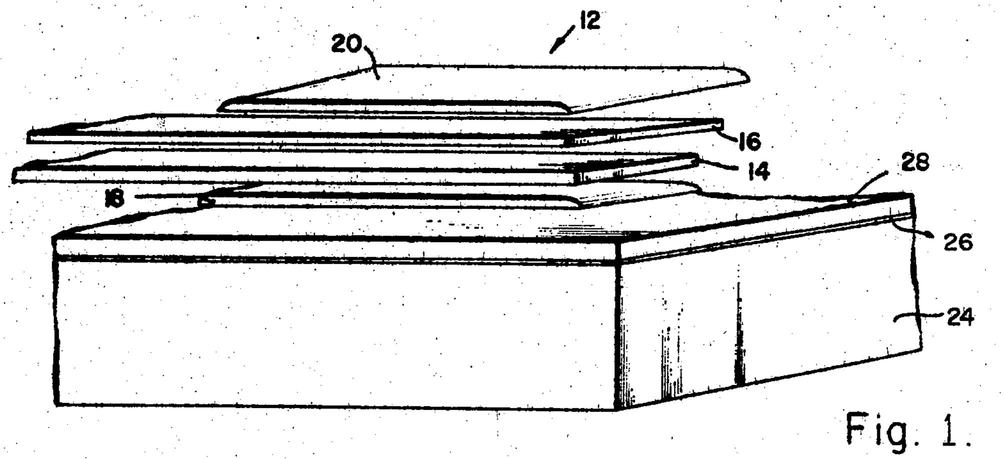
FIGURE 1 is an exploded perspective view of a 2-winding transformer.
Figure 2:
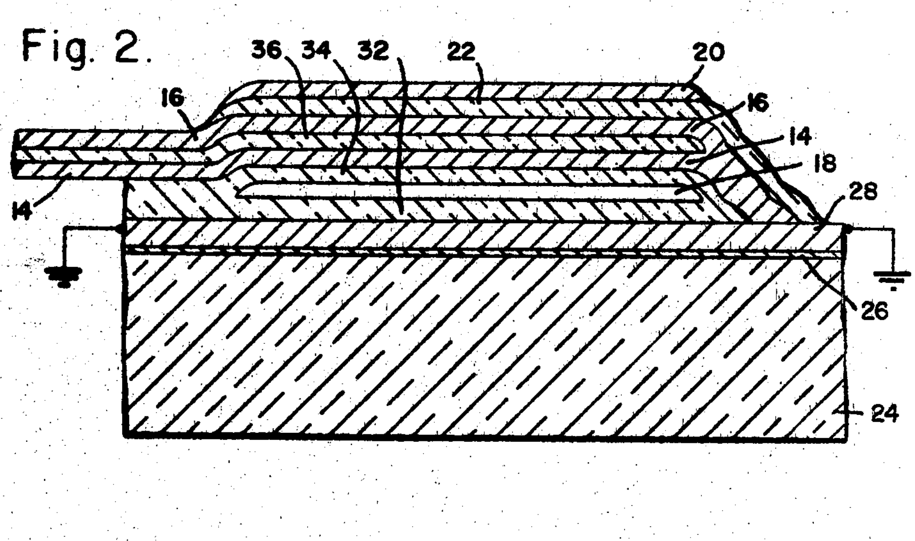
FIG. 2 is a cross-sectional side view showing the relationship of the transformer elements of FIG. 1 when assembled.

In describing the details of a particular embodiment, reference is made to a thin film transformer 12, illustrated in FIGS. 1 and 2. Structurally, the transformer 12 includes two thin film conductors 14 and 16 which are sandwiched between a pair of thin film magnetic elements 18 and 20. The conductors 14 and 16 and the magnetic elements 18 and 20 are inductively coupled with one another and are electrically insulated from one another such as by glass 22 in the manner illustrated in FIG. 2 and are mounted on a substrate 24 in a manner to be explained in detail shortly.

In operation, electrical current flowing through a conductor such as 14 develops a magnetic field which changes the magnetization of the magnetic elements 18 and 20 such as by domain wall motion. The change in magnetization induces an electrical signal in the other conductor 16 whereupon an output signal can be detected at one end thereof.

Referring now to the details of the transformer 12 and to the possible methods for making same, the substrate 24 can be an electrically insulating material such as Corning Microsheet No. 0211, which is an alkali zinc borosilicate, described in Corning Glassware's Bulletin CCP2/5M/9–62.

Thin film layers of material can be built up upon the substrate 24 by vapor deposition or sputtering in a conventional multiple source vacuum system which operates on a mask changing technique (not shown).

In order to provide adhesion with the glass, an interface 26 of chromium is deposited upon the surface of the glass 24.

A ground plane 28 of copper, 2 microns thick, is deposited on the chromium interface by vapor deposition or by sputtering. Electrically, the edges of ground plane 28 are connected to a terminal at a reference potential or ground.

An electrically insulating layer 32 of glass, 2 microns thick, is built up upon a select area of the ground plane 28, such as by RF sputtering. This glass can have a dielectric constant of 5.

Thereafter, the magnetic element 18 of permalloy, 1 micron thick, is built up upon a select portion of the insulating layer 32 such as by DC sputtering or by vapor deposition. Structurally, the magnetic element 18 could, for example, be a rectangle 1 centimeter long by 30 mils wide and could require a coercive force $H_c$ of 1 oersted and exhibit square B–H loop characteristics. Of course, the values could be higher or lower.

Thereafter, another electrically insulating layer 34 of of glass 2 microns thick, is built up upon the magnetic element 18 to enclose it in electrical insulation from other circuit components.

A conductor 14 of copper, 2 microns thick, is built up upon a select area of the electrically insulating layer 34 and extends through a volume of space bounded by the edges of the magnetic element 18. This copper can be built up by vapor deposition or by sputtering, in the manner previously described. Structurally, the conductor 14 is substantially planar and might be ⅔ of the width of the magnetic element 18. In addition, one end of the conductor 14 is electrically connected to the ground plane 26.

Another electrically insulated layer of glass, 2 microns thick, is built over the conductor 14 and the thin film magnetic element 18.

Thereafter, the other conductor 16 of copper, 2 microns thick, is built up by vapor deposition or sputtering upon a portion of the surface of the electrically insulating layer 36 within the area defined by the bounds of the magnetic element 18. This conductor 16 can be in substantially vertical registry with the conductor 14 and also be ⅔ of the width of the magnetic element 18. This conductor 16 is also electrically connected at one end to the ground plane 26.

Another electrically insulating layer 22 of glass, 2 microns thick, is built up by RF sputtering to encase the conductors 14 and 16 and the magnetic element 18 in electrical insulation from other circuit components.

Thereafter, the second magnetic element 20 of permalloy, 1 micron thick, is built up over the other circuit elements in an area which is in substantial vertical registry with the magnetic element 18. Thus, structurally, the conductors 14 and 16 are sandwiched between the pair of magnetic elements 18 and 20. In addition, the conductors 14 and 16 are magnetically coupled to the thin film magnetic elements 18 and 20 to provide the transformer action.

In operation, when an electrical signal is applied to one end of a conductor such as 14, an electrical current flows therethrough to the ground plane 28. As a result of the current flow, a magnetic field is built up around the conductor 14 and is magnetically coupled to the thin film magnetic elements 18 and 20.

If the intensity of the magnetic field is sufficiently high, domain wall motion occurs within the thin film magnetic elements 18 and 20. More specifically, the magnetic intensity H is high across that portion of the magnetic thin film magnetic elements 18 and 20 within the superposed areas above and below the conductor 14. Beyond the superposed areas, the magnetic field tends to become normal to the plane of the thin film magnetic elements 18 and 20 because of the conductor's edge effects. Furthermore, as illustrated in FIG. 3, the superposed edge areas of the thin film magnetic elements 18 and 20 beyond the bounds of the conductors 14 and 16 are only spaced from one another by the thickness of three electrically insulating layers 22, 34 and 36 (6 microns).

As the magnetic intensity H, due to the primary drive currents in conductor 14, exceeds the coercive force $H_c$ of the thin film magnetic elements 18 and 20, most of the thin film elements 18 and 20 will switch by domain wall motion if a very small increment of current is added thereto. Consequently, the thin film transformer 12 exhibits square B–H loop characteristics. As a result, it can be used for a coincident current transformer of the type commonly associated with memory word drive lines, as will be subsequently described in more detail with reference to FIGS. 4 and 5.

In addition, it has been determined that the thin film magnetic transformer 12 will have a large enough volt time integral when receiving an input current which rises linearly from 0–300 ma. in 30 secs. to maintain a drive current for a sufficient time when driving a conventional load such as the above-mentioned thin film memory.

In order to increase the volt time output without slowing the switch speed, the thin film magnetic elements 18 and 20 can each include additional superposed and electrically insulated layers of magnetic material 18' and 20', respectively, as schematically illustrated in FIG. 3. Of course, more than two layers could be fabricated and the insulated layer eliminated or replaced by an oxide layer.

When thin films of the order of 1,000 A. thickness of 80–20 nickel-iron alloy are deposited on a substrate by electroplating, vapor deposition in vacuum or by sputtering, the magnetic property of this alloy will exhibit a marked magnetic anisotropy unless precautions are taken to prevent this. The magnetic anisotropy is evidenced by a square B–H loop (FIG. 4) in the easy direction, or axis of anisotropy direction of the internal magnetic field and a straight line or near zero loss hysteresis curve (FIG. 5) in the hard direction. The constants are generally associated with this phenomena: $H_c$ or coercive force which is the magnetic intensity required to move a domain wall in the easy direction; and $H_k$ the anisotropy constant or magnetic intensity required to rotate the magnetic vector at right angles to the easy direction. This process usually involves very low hysteresis loss. In general $H_c$ is less than $H_k$ and it requires less magnetic intensity to reverse the magnetic state of the film in the easy direction than to rotate it into the hard direction.

In the case of very thin films (1,000 A. thick and less), film can be switched by rotation faster than by wall motion. Typical film has resonant frequencies of the order of 500 mc. when driven by rotation from the hard direction to the easy direction. Domain wall velocities limit the speed at which film can be switched in the easy direction. The walls travel at velocities of the order of 10,000 centimeters per second per oersted drive field in 1,000 A. thick films.

As far as the above-described embodiment of the thin film transformer is concerned, the switching speed will be determined by magnetically reversing fairly thick films (1 micron) or thereabouts. Whether the switching is by domain wall motion or by rotational switching, the speed of switching will be affected by eddy current damping and hence the properties of significance are size, M (the volume magnetic moment) and resistivity of the material. It has been found that a 0.03" wide by 0.4" long, 1 micron thick Permalloy film can have its magnetic state reversed in the order of 30 nanoseconds with drive fields of the order of 1 oersted in excess of $H_c$. This time will be different depending upon whether a domain wall is propagated normal to its surface or the film is reversed by rotation of its magnetic vector. However, for the dimensions stated, eddy current damping is the most significant factor contributing to the delay in reversing the film's magnetic state. It is not found that switching times will be greatly altered whether the domain wall motion or rotational magnetic switching is used.

It appears that switching in the easy direction by domain wall motion (FIG. 4) is advantageous in the thin film transformer design because square loop characteristics are useful in establishing conditions for magnetic reversal with current in two conductors simultaneously but not one alone. Both the conductors are presumed to act together to reverse the magnetic state of the transformer core. If rotational switching is employed (FIG. 5), then partial magnetic rotation of the transformer core will occur if the field from a single conductor is sufficient to overcome the bias field. Hence more bias is required for this type of coincident current switching and hence not as great an efficiency is realized in the transformer drive requirements.

Figure 4:
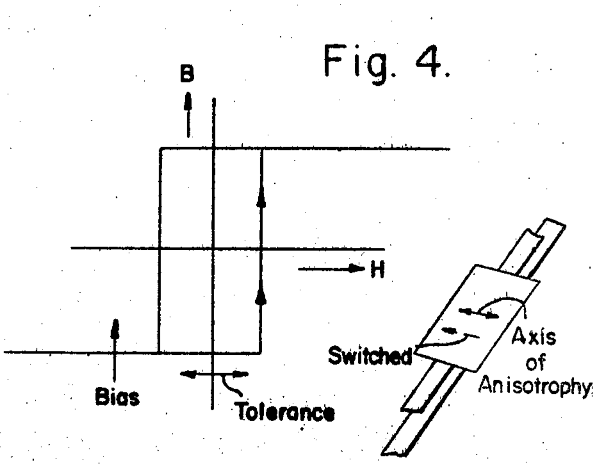
FIG. 4 is a square B–H loop hysteresis curve of the thin film magnetic material in the easy direction parallel to the axis of anisotropy.

Using rotational switching, it can be seen that bias must be larger than in FIG. 4 which uses domain wall switching, and tolerance limits allowable in the magnetic field H in FIG. 4 can only be obtained by increasing bias and drive currents.

In addition, it is possible to prepare magnetically isotropic nickel-iron alloy in 80–20 ratio having $H_c=1$ oersted or thereabouts and this film would switch by domain wall motion regardless of orientation. Such film has been parpared in a rotating magnetic field or by rotating the film in a magnetic field in which it is being formed. This prevents and direction being a preferred direction of magnetization by alignment of iron atoms in the crystal lattice and other phenomena which may be induced by preparing the film in a controlled magnetic field to produce a controlled magnetic anisotropy.

There does not seem to be any particular advantage in using magnetically anisotropic film other than the fact that it is easier and more economical to fabricate than truly isotropic alloy.

Referring now to a preferred embodiment, FIG. 6 and FIG. 7 illustrate a coincident current transformer 50 of the type commonly associated with word selection in magnetic memories. Generally, the current coincident transformer 50 includes four layers of electrical conductors 52, 54, 56, and 58 sandwiched between two thin film magnetic elements 18 and 20. These layers of conductors and magnetic elements can be built up upon the substrate 24 with alternating layers of electrically insulating material, such as glass, by the method described in the previous embodiment.

The thin film magnetic elements 18 and 20 are generally the same structurally and operationally as the corresponding magnetic elements of the preceding embodiments.

The conductors 52, 54, 56 and 58 are of the same material and general dimensions as the conductors of the preceding embodiment and are arranged to operate in the following manner:

Starting with the uppermost conductors, which is just the opposite order in which they are built up upon the substrate, the top conductor 52 is a *y*-select conductor through which current will flow to create a magnetic field having an intensity less than that required to exceed the coercive forces $H_c$ (and the bias field if used) of the thin film magnetic elements 18 and 20. A typical circuit for providing the *y*-select current might include an n-p-n common collector transistor 60 which is connected in circuit with one end of the *y*-select conductor 52 in accordance with logic design. The other end of the *y*-select conductor 52 is coupled to the collector of an n-p-n common emitter transistor 62 through a diode 64 and a resistor 66, in accordance with logic design requirements.

The next lower conductor 54 is an *x*-select conductor which generates a magnetic field which is additive with the magnetic field of the *y*-select conductor 52. Operationally, when the *x*-select current is coincident with the *y*-select current, the combined magnetic fields have sufficient intensity to switch the thin film magnetic elements 18 and 20 by domain wall motion in the manner previously described. The *x*-select current can be provided by a circuit including an n-p-n transistor 68 having its emitter terminal connected to one end of the *x*-select conductor 54, in accordance with logic design requirements. The other end of the conductor 54 is coupled to the collector terminal of an n-p-n transistor 70 through a diode 72 and resistor 74.

The next layer includes a bias conductor 56 through which a bias current flows. The magnetic field generated by the bias current must have a sufficient magnitude to reset the thin film elements 18 and 20 after the current drive pulse has been developed on the word drive line 58 on the lowermost layer. In addition, the use of a bias current will make control of the transformer thin film magnetic elements less critical, allowing for greater margins in the *x*-select and *y*-select currents for thin film element variations and for B–H loop skew.

The lowermost layer includes the word drive line 58 upon which an output pulse is induced when the thin film magnetic elements 18 and 20 are switched by the magnetic field H that occurs when there is coincidence between the *x*-select current and the *y*-select current in conductors 52 and 54 respectively.

It has been determined that a transformer of these dimensions will have a sufficient volt time integral to support a drive current which rises linearly from 0 to 300 ma. in 30 nsec. when driving a 32-bit word in a thin film memory of conventional structure. In this regard, the individual bits of the thin film memory each are represented by a thin film memory cell which is 0.015" wide by 0.03" long and 1,000 A. thick, having a coercive force $H_c$ of 2.5 oersteds and an anisotropy constant $H_k$ of 3.5 oersteds.

Although the preceding embodiments have been illustrated and described as containing windings of a single turn, the drive currents can be reduced by providing planar multiple turn conductors of the type illustrated in FIG. 8. The word line in FIG. 8 is shown schematically wherein the word drive current makes a first pass over the memory elements, through the linear portion 76, then makes a lateral outward transfer through the insulated crossover member 78 connected to one end of the word line portion 76. The current is then fed back through a word line portion 80, is then transferred laterally inward and is again passed over the memory cells through a word line portion 82 for a second pass.

Although this planar multiple turn arrangement reduces the *x*-select current and *y*-select current requirements, the transformer-volt time integrals are greatly increased because the longer line required has a greater resistance. As a result, the thin film elements must be increased in size or else the word line must be made thicker to compensate for its high resistance. For example, if the word line were made long enough, the thin film magnetic elements 18 and 20 might be made 2 centimeters long or the word line could be made 10 microns thick.

Although one possible use of the transformer has been described with reference to thin film planar magnetic memories, it should also be possible to use the transformer for driving plated wire memories.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. A thin film coincident current transformer comprising:

a first and a second planar conductor means said first and said second conductor means being operable to carry electrical currents for producing magnetic fields thereabout each oriented in a first direction;

a third planar conductor means operable to carry a bias current for producing a DC bias magnetic field thereabout in a second direction opposite the first direction;

a fourth planar conductor means positioned in registry with said first, second, and third planar conductor means being operable to conduct an output signal;

a first and a second substantial planar thin film anisotropic magnetic element, said anisotropic magnetic elements being positioned to sandwich said conductor means therebetween and to extend widthwise beyond the edges of said conductor means, said anisotropic magnetic elements being inductively coupled to be DC biased to saturation in the second direction by said third planar conductor means, and to be magnetically switched when the coincident magnetic fields produced in the first direction by said first and second planar conductor means exceeds by a predetermined level the DC biased saturation, said thin film anisotropic magnetic elements being further inductively coupled to induce an electrical output signal in said forth conductor means when magnetically switched; and means for electrically insulating said planar conductor means and said anisotropic magnetic elements from one another.

2. The thin film coincident transformer of claim 1 in which the axis of anisotropy of said thin film anisotropic magnetic element is transverse to the first and second magnetic field direction and said magnetic elements are magnetically switched by rational switching.

3. The thin film coincident transformer of claim 1 in which the axis of anisotropy of said planar thin film anisotropic magnetic element is parallel to the first and second magnetic field directions and said magnetic elements are magnetically switched by domain wall motion.

4. A thin film coincident current transformer comprising:

a first, a second, a third, and a fourth planar thin film conductor, each of copper 2 microns thick and mounted in separate, spaced-apart layers substantially parallel to the plane of each other, and in substantial registry with one another, said first thin film conductor being adapted to produce a drive current in response to a change in the magnetic flux coupled thereto, said second conductor being adapted to carry a bias current for generating a bias magnetic field, said third thin film conductor being adapted to carry an $x$-select current for producing an $x$-select magnetic field in response thereto, and said fourth thin film conductor being adapted to carry a $y$-select current for producing a $y$-select magnetic field, the $x$-select and the $y$-select magnetic fields being additive with one another;

a plurality of layers of glass, each two microns thick, each mounted adjacent the face of said conductor means for electrically insulating said conductors from adjacent elements;

a first and a second thin film magnetic element, each of coercive force $H_c$ of between 1 and 5 oersteds, said Permalloy, one micron thick, which requires a thin film magnetic elements having a length of about one centimeter and a width of about 30 mils, and being about 50% wider than said conductors and being located in substantially parallel, spaced-apart planes which are parallel to the plane of said conductors, said thin film magnetic elements operably formnig a substantially square B–H loop magnetic circuit with one another and being adapted to be magnetically switched by domain wall motion in response to coincident $x$-select and $y$-select magnetic fields produced by said conductors, the domain wall motion changing the magnetic flux coupled to said first conductor for producing the drive current signal.

5. The device of claim 4 in which said first planar thin film conductor is a multiple-turn planar winding for passing the drive current over discrete areas a plurality of times.

References Cited

UNITED STATES PATENTS

| | | | |
|---|---|---|---|
| 3,193,692 | 7/1965 | Davis et al. | 307—88 |
| 3,362,065 | 1/1968 | Lauriente et al. | 29—604 |
| 3,270,327 | 8/1966 | Davis | 340—174 |
| 3,276,000 | 9/1966 | Davis | 340—174 |
| 3,371,325 | 2/1968 | Hounsfield | 340—174 |
| 3,305,845 | 2/1967 | Grace et al. | 340—174 |
| 3,375,503 | 3/1968 | Bertelsen | 340—174 |

FOREIGN PATENTS

| | | |
|---|---|---|
| 367,854 | 4/1963 | Switzerland. |

STANLEY M. URYNOWICZ, Jr., Primary Examiner

PO-1050
(5/69)

UNITED STATES PATENT OFFICE
CERTIFICATE OF CORRECTION

Patent No. 3,493,941 Dated February 3, 1970

Inventor(s) William W. Powell and Michael May

It is certified that error appears in the above-identified patent and that said Letters Patent are hereby corrected as shown below:

Col. 3, line 60, "30 secs." should be --30 nsecs.--.
Col. 4, line 6, "The" should be --Two--;
line 71, "and" should be --any--.
Col. 6, line 73, "rational" should be --rotational--.
Col. 7, lines 26 and 27, "coercive force $H_c$ of between 1 and 5 oersteds, said Permallyoy, one micron thick, which requires a" should be --Permalloy, one micron thick, which requires a coercive force $H_c$ of between 1 and 5 oersteds, said--.
Col. 8, line 5, "formnig" should be --forming--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents